June 2, 1942.  W. K. BERTHOLD  2,284,796
APPARATUS FOR AND METHOD OF FORMING AND TREATING GLASSWARE
Filed Dec. 20, 1939  2 Sheets-Sheet 1
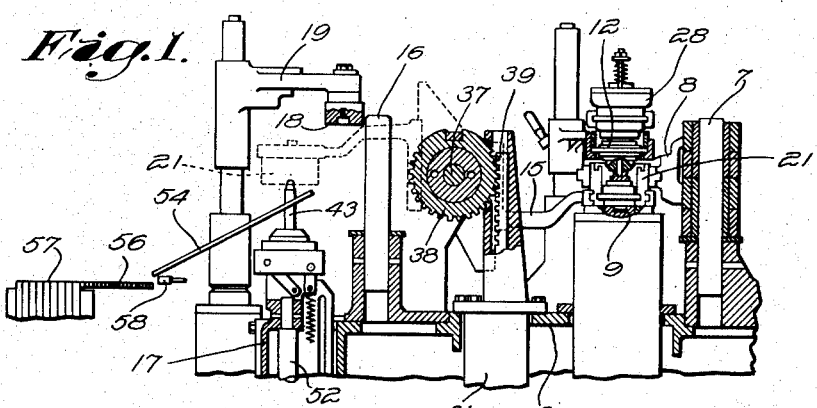
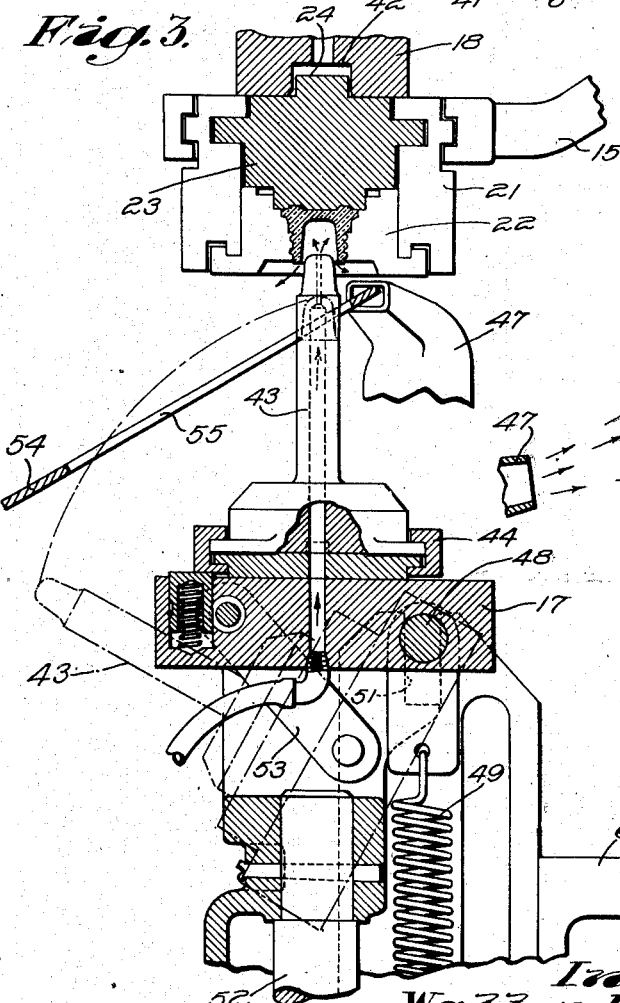
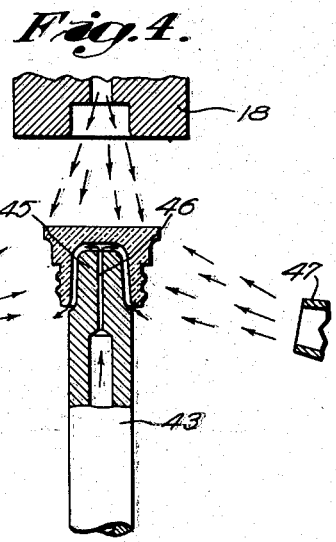

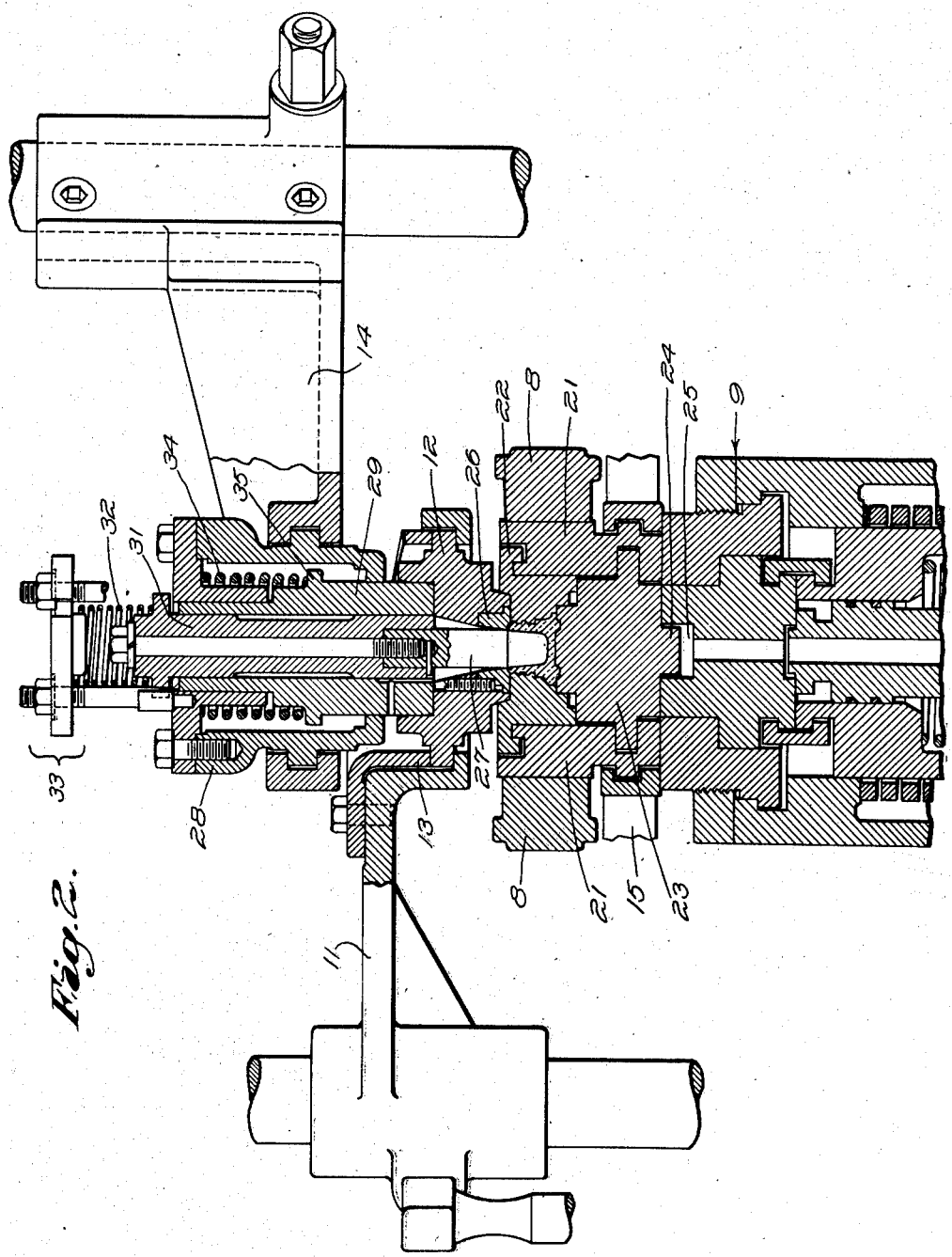

Patented June 2, 1942

2,284,796

UNITED STATES PATENT OFFICE 2,284,796

APPARATUS FOR AND METHOD OF FORMING AND TREATING GLASSWARE

Walter K. Berthold, Rockville, Conn., assignor to Hartford-Empire Company, Hartford, Conn., a corporation of Delaware Application December 20, 1939, Serial No. 310,100

13 Claims. (Cl. 49—14)

This application is filed for the purpose of claiming the divisible inventive subject matter of my co-pending application, Serial No. 100,246, filed September 11, 1936, for Machine for making purely pressed glassware, comprising novel apparatus for and methods of forming and cooling hollow glassware. As in my aforesaid original application, Serial No. 100,246, of which the present application is a continuation in part, such inventive subject matter is illustrated in the drawings and described in the specification of the present application in connection with the structural and operating features of a feeder-fed forming machine operating on the narrow neck principle but provided with suitable instrumentalities and actuating mechanisms for pressing charges of molten glass into articles of glassware and for handling such ware. The invention to be protected by this application is independent of the specific means employed to form the charges of molten glass into articles of glassware and provides novel combinations of structural elements and cooperative steps by which charges of molten glass are formed in suitable molds into articles of hollow glassware by any suitable means and in any suitable way and are cooled at their outer and inner surfaces by novel means and in a novel manner so as to have the requisite strength, durability, and physical characteristics for the use or purpose intended.

Other features and advantages of the invention will hereinafter be pointed out or will be apparent from the following description of the construction and operation of the machine shown in the accompanying drawings, in which:

Figure 1 is a view in vertical sectional elevation of a portion of a narrow neck machine embodying the invention, parts being omitted for clarity in illustration;

Fig. 2 is a similar view on enlarged scale, showing in detail the means for pressing the ware;

Fig. 3 is a view similar to Fig. 2, but showing in detail means for receiving, cooling and discharging the pressed ware from the machine; and Fig. 4 is a view illustrating the operation of supporting and cooling an article of ware in preparation for its discharge from the machine.

For purposes of illustration and not in limitation of the invention, the illustrated embodiment (Fig. 1) consists of the adaptation of the invention to one section of the Hartford individual section machine, disclosed in the patent to H. W. Ingle, No. 1,911,119, dated May 23, 1933, it being understood that the same adaptation may be made to any number of sections of such machine.

As shown in Fig. 5 of the Ingle patent, each section of such machine comprises a blank mold and neck pin located at the blank forming station and with which cooperate a delivery funnel, a settle blow head and a neck mold. These and the other narrow neck forming devices are removably attached to their respective operating members for the purpose, but only for the purpose, of substituting other similar devices in changing from the production of one size or style of narrow neck ware to another.

Similarly, as shown in Fig. 1 herein, the base of the machine supports vertical shaft 7 for holders, one of which appears at 8 which in Ingle carry the blank mold sections. At 9 is shown what in Ingle constitutes the neck pin operating mechanism, at 11 (Fig. 2) Ingle's funnel carrying arm, (in which funnel 12 of the present invention is removably secured by ring 13), at 14 an arm similar to Ingle's settle blow head arm and at 15 Ingle's inverting neck mold carrying and transfer arm.

Each section of the machine of the patent also includes a blow mold at the finish blowing station and hence Fig. 1 herein shows the vertical shaft 16 for the blow mold sections of such mold of the patent (not shown), and the member 17 for tilting the bottom plate (not shown) of the patent. Also shown at this station is a finish blow head 18 and Fig. 1 shows at 19 the finish blow head operating arm both substantially as shown in the patent to Ingle.

The operation of the actuating or carrying members of the narrow neck machine will be explained hereinafter, it being desired first to describe the utilization of such members in the operation of pressing and pressed ware handling devices.

Referring to Figs. 2 and 3, it will be seen that the neck mold carrying arm has removably fitted therein a sectional holder, as indicated at 21, which carries the sections of pressing mold 22, and a solid mold bottom or closure 23, to form a mold cavity of the shape desired, in this instance for forming a threaded fuse case. The mold bottom 23 has a lug 24 thereon which is received in an opening 25 of the neck pin mechanism 9, whereby the latter serves to center the mold bottom and the mold 22 for registration with pressing ring 26. As will be apparent from Fig. 2, mechanism 9 serves as a support or rest for the pressing mold during the operation of pressing.

Ring 26 is secured in and forms part of funnel 12 by screw means, as shown, and these parts receive therethrough pressing plunger 27, for the operation of which plunger carrying arm 14 is employed.

The plunger assembly includes casing 28 removably secured in known manner in the arm 14, as by means of lugs and flanges or a bayonet joint, as partially shown, this casing containing spring pressed plunger sleeve 29 which fits into funnel 12 and in which plunger carrier 31 is slidably mounted under pressure of spring 32 in cage 33 on the casing. The downward movement of the plunger assembly is stopped by spring 34 engaging shoulder 35, the degree of pressure applied to the plunger depending upon the strength of spring 32, as will be understood.

To insure that the mold sections 22 will remain closed during the pressing operation, the blank mold carrying arms 8 (Fig. 2) are employed as a mold lock to the holders 21 for the mold sections.

The funnel carrying and plunger carrying arms 11 and 14 are oscillated and lowered by the shafts upon which they are mounted by means shown in detail in the Ingle patent. Said patent likewise discloses means for vertically adjusting the neck pin operating mechanism 9 which is held in fixed position for centering the mold bottom 23, and the means for operating holders 8, as well as the mechanism for inverting arm 15. Such mechanism is partially shown in Fig. 1 and includes oscillating shaft 37 carrying gear 38 engaged by rack 39 which is reciprocated by a piston (not shown) in cylinder 41.

The mechanisms for oscillating and lowering finish blow head 18 and the bottom plate carrying member 17 also are shown in detail in the Ingle patent. The functions of these members in making pressed ware are as follows:

The inverting of arm 15 inverts the press mold into the position shown in Fig. 3 in registry with discharge member 43 which replaces the blow mold at the finish blowing station, whereupon the finish blow head is lowered to engage opening 42 therein with lug 24 on the mold bottom 23 for centering the latter and stripping the pressed article from mold 22. At this position, the mold is opened in the same way as in releasing a blank for a narrow neck article, preferably by the means provided in the Ingle patent for opening the neck ring of the narrow neck machine. This serves to deliver the pressed article to the ware cooling and discharge device 43.

This device 43 is removably secured to the bottom plate carrying member 17 by a bayonet joint indicated at 44, and its upper end is shaped to conform to the interior of the pressed article, as indicated at 45. In order to support and cool the pressed article, and out of contact with member 43, an air jet is delivered through orifice 46 in member 43 into the cavity of the article. This serves to hold the article out of chilling contact with the discharge member 43, as illustrated in Fig. 4. While so held, cooling air may be applied to the article from opposed nozzles 47—47. Thus the article is cooled both internally and externally. When cooled to the desired degree, discharge member 43 is moved vertically downwardly to clear the mold 22 and then tilted by the operation of the mechanism normally used for lowering and tilting a bottom plate. The details of such mechanism may be best understood by reference to the Ingle patent. It is sufficient to explain here that member 17 is pivoted at 48 and is held in horizontal position by spring 49 until moved vertically downwardly the length of slot 51, whereupon member 17 is tilted into the dotted line position of Fig. 3. These operations are caused by a piston (not shown), the rod 52 of which is connected to member 17 by links, one of which appears at 53. Such movement delivers the article to a slide 54 having a slot 55 therein, through which works discharge device 43. The article comes to rest on a dead plate 56 and is then pushed onto conveyor 57 by a pusher indicated at 58.

Various types of pressed ware may be produced by the machine embodying this invention and changes made in the construction and operation of the several parts without departing from the scope of the appended claims. The design of discharge device 43 may be changed to suit different types of ware.

If desired, cooling air may be applied locally to the upper surface of the glass article while it is being cooled externally by air from the opposed nozzles 47—47 and internally by air from the member 43. This may be conveniently done by use of blow head 18 of the machine as hereinbefore described. Of course, such blow head must first be raised from its Fig. 3 position to permit return swinging movement of the mold 22 toward the station at which another article of glassware is to be pressed therein. After such return movement of the mold, the blow head 18 may be lowered to the position shown in Fig. 4 and used as a cooling air nozzle to supplement the nozzles 47—47 in cooling externally the glass article which is then being supported on and cooled internally by the continuous column or jet of air that discharges from the member 43.

From the above description and the drawings, it will be seen that my invention provides novel means whereby a narrow neck machine may be employed in producing either narrow neck ware or purely pressed glassware, the instrumentalities for producing the one type of ware being quickly and easily replaced by the devices for making the other type of ware. Also, exchangeable devices may be used for making different kinds of pressed ware.

It has not been considered necessary to illustrate herein timing mechanism for timing the automatic operation of the various parts of the machine with each other and with the feeder (not shown) for delivering successive charges of glass to funnel 12 because timing mechanism for this purpose is disclosed in the patent to Ingle referred to above and by simple adjustments is employed in the production of either pressed ware or narrow neck ware, as desired.

The cooling provisions herein described afford efficient and convenient means for cooling the article of glassware produced quickly and thoroughly to the degree desired, as to assure adequate strength and durability of the article for the use for which it is intended. One advantage of such cooling provisions is that the cooling of the article is commenced at both its inner surface and its outer surface quickly after the formation of such article and while it retains sufficient heat to have the desired plasticity underneath its surface portions. Thus, the cooling air from the member 43 will initiate cooling of the article at its inner surface while such article is in the mold and is being cooled at its exterior by the mold walls. Such internal cooling will continue during and after the air jet or column discharging from the member 43 takes over the additional function of supporting the article at its interior on opening of the mold to release the article. This manner of supporting the article on its release from the mold not only effects continued cooling of the article at its interior but leaves the entire outer surface of the article unobstructed and exposed for cooling by the application of cooling air or other fluid medium thereto.

The invention herein disclosed that is directed to forming and handling purely pressed ware by means of a press mold and suitable cooperative instrumentalities and actuating mechanisms in a machine operating on the narrow neck principle is not claimed herein as such invention has been made the subject of the claims of my aforesaid original application, Serial No. 100,246, filed September 11, 1936, on which Patent No. 2,207,676 was granted to me July 9, 1940.

I claim:

1. In a glassware forming machine, a device for receiving hollow articles of glassware and to discharge such articles from the machine, means for holding said device in position to receive an article of ware, and for actuating said device to discharge said article, and an orifice in said device for applying a jet of air to said article to hold it out of chilling contact with said device.

2. In a glassware forming machine, a device for cooling and discharging articles of ware from said machine, means for holding said device in position to receive an article of ware, an orifice in said device for applying a jet of air to said article to hold it out of chilling contact therewith and to cool said article from beneath, and cooling nozzles for directing cooling air over the exterior of said article while riding on said jet of air.

3. In apparatus for making hollow glass articles, a ware cooling device and means for transferring the hollow glass articles successively and each in inverted position to said ware cooling device, said device having an orifice therein for applying a jet of air to the interior of each article transferred thereto to cool the interior of said article and to hold said article out of chilling contact with said device.

4. In apparatus for forming and treating hollow articles of glassware, an openable mold containing an article of glassware, means for opening the mold, means for blowing cooling gaseous medium into the interior of the article before and after the mold has been opened, and means operable during the continued blowing of cooling gaseous medium into the interior of the article for blowing cooling gaseous medium on the external surface of the article after the mold has been opened.

5. In apparatus for forming and treating articles of hollow glassware, an openable mold containing an article of glassware, means for opening the mold to release the article therefrom, and means for supporting the article at its interior only on release from the mold and for discharging cooling fluid medium against the internal surface of said article.

6. In apparatus for forming and treating articles of hollow glassware, an openable mold containing an article of glassware, means for opening the mold to release the article therefrom, and means for supporting the article at its interior only on release from the mold and for discharging cooling fluid medium against the internal surface of said article before, during and after such release.

7. In apparatus for forming and treating articles of hollow glassware, an openable mold containing an article of glassware, means for opening the mold to release the article therefrom, means for supporting the article at its interior only on release from the mold and for chilling the entire inner surface of said article when thus supported and other means for cooling the article externally after it is released from the mold.

8. In apparatus for forming and treating articles of hollow glassware, an openable, bodily movable mold containing an open-ended hollow article of glassware and positioned at a delivery station with the open end of the article facing downwardly, means for applying a cooling gaseous medium under pressure in upward direction into the interior of the article at the delivery station to cool said article internally and to assume support of the article on the release thereof from the mold, and means for opening the mold to release the article therefrom.

9. In apparatus for forming and treating articles of hollow glassware, an openable, bodily movable mold containing an open-ended hollow article of glassware and positioned at a delivery station with the open end of the article facing downwardly, means for applying a cooling gaseous medium under pressure in upward direction into the interior of the article at the delivery station to cool said article internally and to assume support of the article on the release thereof from the mold, and other means for applying a cooling gaseous medium to the external surface of the article on its release from the mold.

10. The method which comprises, applying a cooling medium to the interior of a hollow article of glassware in a mold while said article is being cooled externally by its contact with the mold walls, separating the article and the molds, continuing the application of cooling fluid medium to the interior of the article and blowing cooling fluid medium against the exterior of such article immediately after separation of the article from the mold to complete the desired cooling of said article.

11. The method which comprises opening a mold containing an article of glassware of the shape desired, and concurrently cooling and supporting the article by applying thereto an upwardly directed continuous stream of cooling fluid medium under pressure prior to, during and after the opening of the mold to release said article.

12. The method which comprises opening an inverted mold containing an article of glassware having an open end facing downwardly, concurrently cooling and supporting the article at its interior by applying thereto an upwardly directed continuous stream of cooling fluid medium under pressure prior to, during and after the opening of the mold to release said article, and applying a cooling gaseous medium under pressure to the external surface of said article after its release from the mold.

13. The method of treating an article of hollow glassware which comprises opening a mold containing such an article to release the article and supporting said article as a whole at its interior solely and directly on a column of cooling fluid under pressure in such manner that the entire outer surface of the article is exposed to the atmosphere, and applying gaseous medium under pressure to the external surface of said article while it is thus supported.

WALTER K. BERTHOLD.